(12) United States Patent
Powell

(10) Patent No.: US 6,783,048 B2
(45) Date of Patent: Aug. 31, 2004

(54) NON-MAGNETIC FASTENER WITH MAGNETIC LOCKING NAIL AND TWO-STAGE HAMMER APPARATUS

(75) Inventor: Kenneth S. Powell, Lawrenceville, GA (US)

(73) Assignee: K & R Industries, Inc., Lawrenceville, GA (US)

( * ) Notice: Subject to any disclaimer, the term of this patent is extended or adjusted under 35 U.S.C. 154(b) by 0 days.

(21) Appl. No.: 10/680,740

(22) Filed: Oct. 7, 2003

(65) Prior Publication Data

US 2004/0065710 A1 Apr. 8, 2004

Related U.S. Application Data

(62) Division of application No. 10/247,201, filed on Sep. 19, 2002.
(60) Provisional application No. 60/323,802, filed on Sep. 19, 2001.

(51) Int. Cl.[7] ................................................. B25C 1/04
(52) U.S. Cl. ...................................... 227/113; 227/147
(58) Field of Search ............................... 227/113, 147, 227/132, 119

(56) References Cited

U.S. PATENT DOCUMENTS

| | | |
|---|---|---|
| 1,158,293 A | 10/1915 | Roberts et al. |
| 1,724,394 A | 8/1929 | Chamberlain |
| 2,427,392 A | 9/1947 | Eckel |
| 2,818,763 A | 1/1958 | Dunlap |
| 3,177,753 A | 4/1965 | Maginnis |
| 3,188,904 A | 6/1965 | Owen |
| 3,519,704 A | 7/1970 | Maginnis |
| 3,979,040 A * | 9/1976 | Denin ...................... 227/113 |
| 4,043,247 A | 8/1977 | Rowinski |
| 4,456,416 A | 6/1984 | Schlein |
| 4,611,964 A | 9/1986 | Schlein |
| 4,673,150 A | 6/1987 | McSherry et al. |
| 4,834,342 A * | 5/1989 | Padgett ...................... 227/147 |
| 4,932,819 A | 6/1990 | Almeras |
| 5,171,118 A | 12/1992 | Rothenbuhler |
| 5,609,271 A | 3/1997 | Keller et al. |
| 5,772,381 A | 6/1998 | Olvera et al. |
| 5,778,623 A | 7/1998 | Powell |
| 5,779,128 A * | 7/1998 | Szczerba .................. 227/113 |
| 5,779,415 A | 7/1998 | Hoene |
| 6,145,723 A * | 11/2000 | Gupta ........................ 227/8 |
| 6,205,602 B1 * | 3/2001 | Dettweiler ................. 7/143 |
| 6,402,007 B1 * | 6/2002 | Dyer ........................ 227/147 |
| 6,499,926 B2 | 12/2002 | Keener |
| 6,585,456 B2 * | 7/2003 | Forse ...................... 405/259.1 |
| 6,598,775 B1 * | 7/2003 | Chen ........................ 227/113 |

* cited by examiner

Primary Examiner—Scott A. Smith
(74) Attorney, Agent, or Firm—Brooks Kushman P.C.

(57) ABSTRACT

A fastener used to secure a surface layer to a base and a two-stage fastener driver used the drive the fastener into the base. The fastener comprising a non-magnetic fastener body retaining a ferro-magnetic nail. The fastener driver for driving the fastener into the base. The fastener driver having a housing for magnetically retaining the fastener.

2 Claims, 2 Drawing Sheets

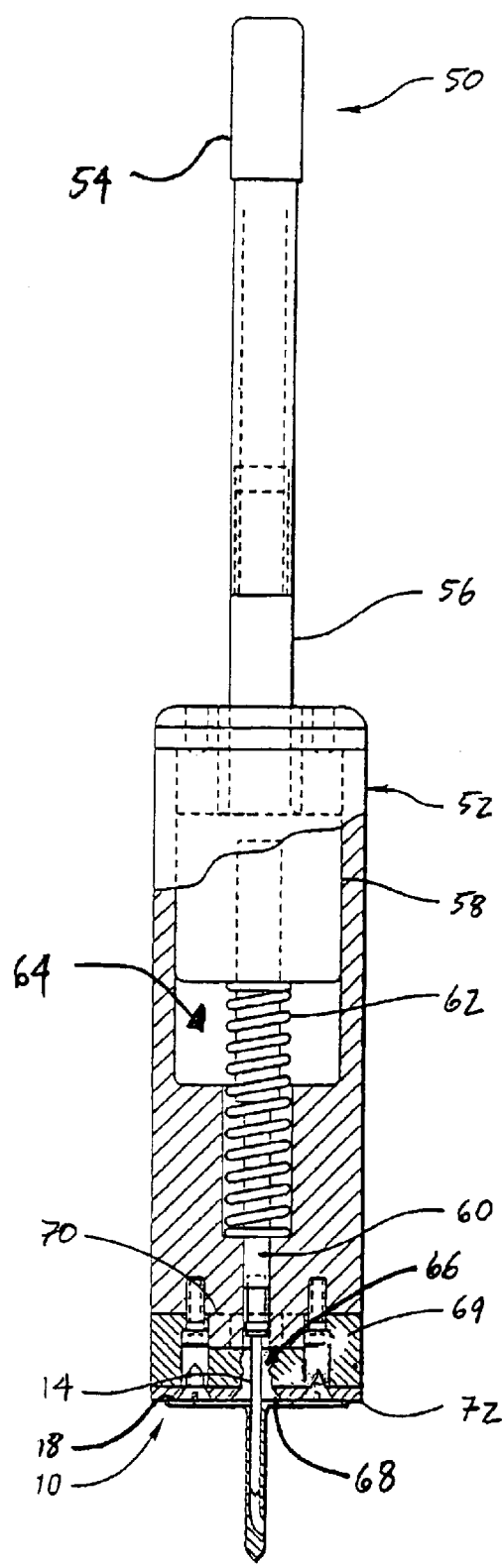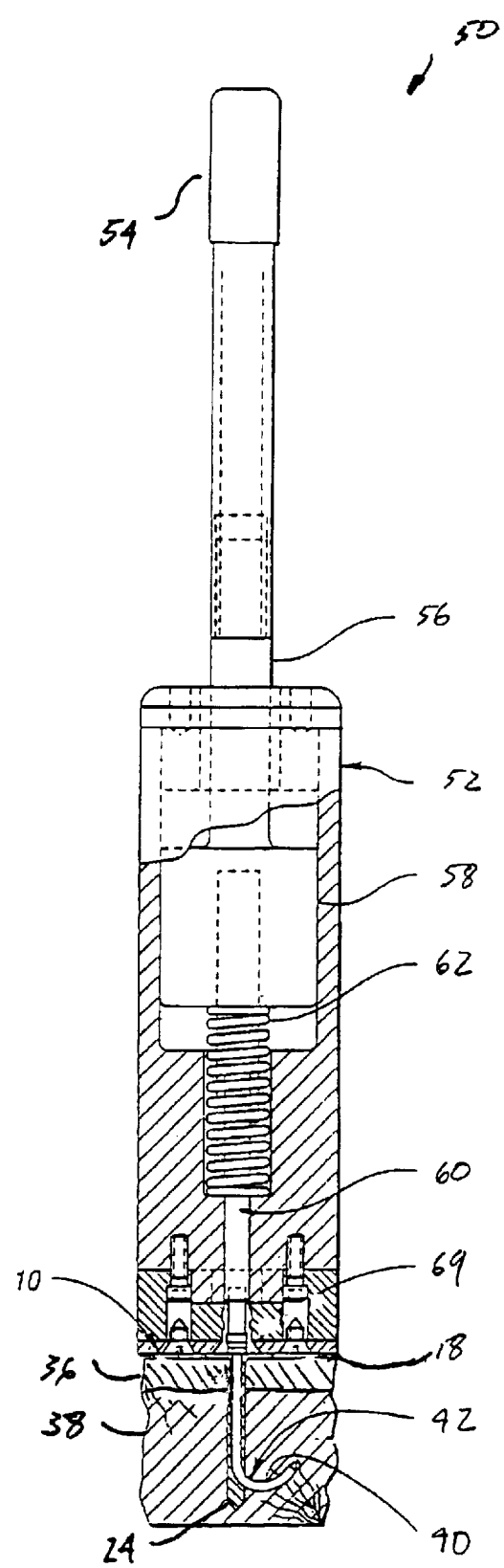

NON-MAGNETIC FASTENER WITH MAGNETIC LOCKING NAIL AND TWO-STAGE HAMMER APPARATUS

CROSS-REFERENCE TO RELATED APPLICATIONS

This is a divisional of copending application(s) Ser. No. 10/247,201 filed on Sep. 19, 2002, pending.

This application claims the benefit of U.S. provisional application Serial No. 60/323,802 filed Sep. 19, 2001.

BACKGROUND OF THE INVENTION

1. Field of the Invention

The present invention relates to fasteners used to secure a surface layer to a base layer.

2. Background of the Invention

To secure a surface layer to a sub-surface layer or base, a fastener can be driven through the surface layer and into the base layer. In some cases the base material may comprise a type of material which has a limited ability to generate forces against the penetrating fastener. Consequently, it is difficult to sufficiently secure the fastener within such materials. Accordingly, it is desirable to provide a fastener which can dig into the base for enhancing the securement of the fastener in the base.

To drive the fastener into the base, a fastener driver is required. In the past, the fastener has been driven into the base with manual operations of a worker holding the fastener with one hand and striking the fastener with a hammer held in another hand. Such driving operations are dangerous. Accordingly, it is desirable to provide a fastener driver which can secure the fastener therein so that the worker does not have to hold the fastener with a hand.

SUMMARY OF THE INVENTION

One aspect of the present invention relates to a fastener adapted for attachment to a base. The fastener includes a non-magnetic fastener body having a hollow tube through which a ferro-magnetic nail is insertable. The fastener body can be driven into the base and the nail can be driven out through a side opening in the tube of the fastener body. The fastener includes a portion of the nail extending beyond a flange of the fastener body for retention of the fastener.

Another aspect of the present invention includes the fastener body having an integral camming surface leading from the side opening to the hollow tube. The nail interferes with the camming surface for interferencly securing the nail to the fastener body and for causing the nail to form a hook configuration when the nail is driven against the camming surface and out the side opening.

Yet another aspect of the present invention relates to fastener driver for driving the fastener described above into the base. The fastener driver includes a drive housing having a inlet leading to a cavity through which the portion of the ferro-magnetic nail extending beyond the flange of the fastener body can be inserted for magnetic retention by a magnet located proximate the cavity. In operation, the drive housing is propelled toward the base, wherein a face on the drive housing contacts the flange of the fastener body to drive the fastener body into the base and, after the fastener body is driven into the base, a driving means drives the nail out through a side opening in the fastener body in a hook configuration.

In yet another aspect of the present invention, the fastener driver includes a weight connected at one side to a driving rod and connected at an opposite side to a driving pin. The weight is suspended within a weight cavity of the drive housing by a spring surrounding the driving pin. The spring provides a biasing force against the weight. The biasing force is overcome by the weight after the fastener body is driven into the base to cause the driving pin to contact the nail for driving the nail out through the side opening.

BRIEF DESCRIPTION OF THE DRAWINGS

FIG. 5 is a side elevational view of a fastener driving device in operating position to drive the nail from the exposed nail position of FIG. 3 to the buried nail position of FIG. 4;

FIG. 6 is a side elevational view of the fastener driving device in its actuated position that causes a portion of the nail to bend out beyond the body into the hook configuration.

DETAILED DESCRIPTION OF THE PREFERRED EMBODIMENTS

Figure 1:
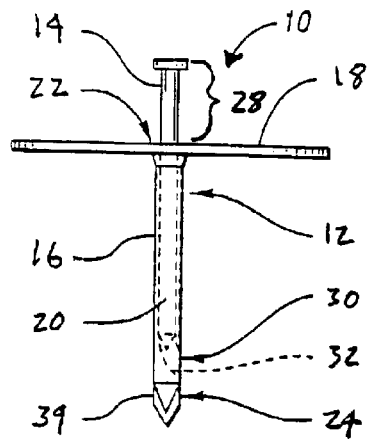
FIG. 1 is a side elevational view of the fastener in accordance with an embodiment of the present invention.

The fastener 10 of the present invention is shown in FIG. 1. The fastener 10 includes a fastener body 12 and a locking nail 14. The fastener body 14 is formed as a monolithic structure in a casting process.

The casting process can be a zinc die casting process or other process, such as, injection molding. The injection molding process can use plastics are nylons. Like zinc, plastic, or nylon, preferably, the fastener body 12 comprises a non-magnetic rust-resistance material. In contrast, the nail 14, preferably, comprises a ferro-magnetic material.

The fastener body 12 includes a tube portion 16 and an integral flat plate or flange 18. The tube portion 16 includes a hollow 20 that extends from the flange 18, at an open bore end 22, to a closed end 24. The hollow 20 provides a passageway within the fastener body 12 through which the nail 14 passes if inserted. When the nail 14 is inserted, a portion of the nail 28 extends beyond the flange 18 and the remaining portion of the nail 14 extends through the hollow 20 toward the closed end 24.

The closed end 24 includes a side opening 30. The side opening 30 leads into a camming surface 32. The camming surface 32 is integrally formed with the fastener body 12 and connects the hollow 20 of the tube portion 16 to the side opening 30. The inserted nail 14 extends from the bore end 22, through the hollow 20, and into contact with the camming surface 32. As described in more detail below, the nail 14 is drivable through the hollow 20, against the camming surface 32, and out the side opening 30.

The fastener 10 comprises the fastener body 12 interferencly secured to the nail 14. The inference is generated from the nail 14 contacting the camming surface 32. Preferably, the interference is sufficient to retain the weight of the fastener body 12, i.e., the portion 28 of the nail 14 extending beyond the flange 18 can be grasped and the fastener body 12 remains interferencly secured to the nail 14 without any other support.

Figure 2:
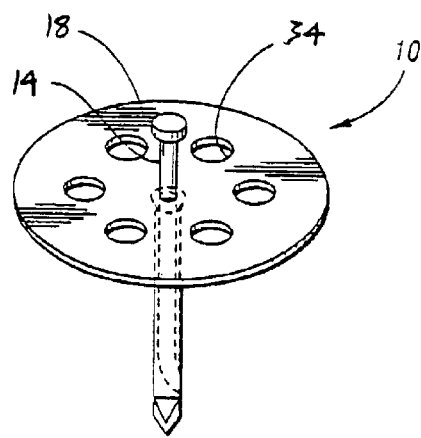
FIG. 2 is a perspective view of the fastener shown in FIG. 1.

A perspective view the fastener 10, with the fastener body 12 interferencly secured to the nail 14, is shown in FIG. 2. The flange 18 extends outwardly from the tube portion 16 in a perpendicular manner. A circular pattern is shown, but the flange 18 could similarly extend in a rectangular or other shaped pattern. Likewise, the flange could extend in a non-perpendicular manner. In addition, the flange 18 may include holes 34. The holes 34 act as a relief for material displacement and seepage.

Figure 3:
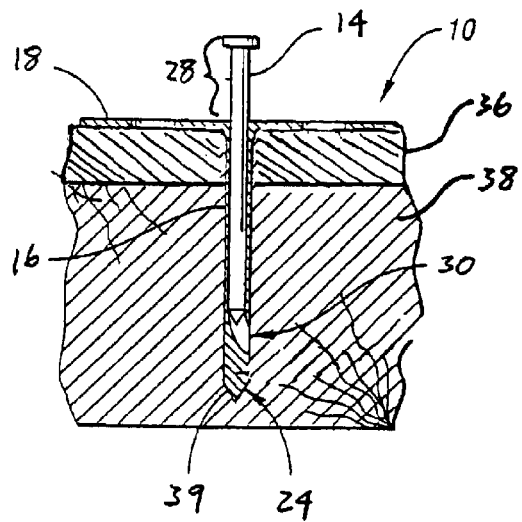
FIG. 3 is a fragmentary section of the base sheet and fastener with a fastener body buried in a base sheet and an exposed ferro-magnetic portion of a nail within a hollow of a tube portion of the fastener body before being driven fully down into the tube.

As shown in FIG. 3, the fastener 10 has penetrated through a surface layer 36 and into sub-surface layer or base 38. This type of action is common in a number of applications including: base sheet fastening, roof insulation board fastening; recovery board fastening; asphalt shingle fastening; aluminum shingle fastening; slate shingle fastening; and tile shingle fastening.

The object of the fastener 10 is to restrict the surface layer 36 from separating from the base 38. Accordingly, the closed end 24 portion of the fastener body 12 is sufficiently pointed for penetrating through the surface layer 36 and into the base 38. The closed end 24 is formed into a wedge, conical, or chisel point 39. With respect to FIG. 3, the fastener body 12 penetrates into the base 38 and retained therein by forces of the base 38 pressing against the tube portion 16.

In some applications the ability of the base 38 to exert force on the tube portion 16 is not sufficient. For example, if the base 38 was gypsum, aggregate/lightweight concrete, cementitious wood fiber, or lightweight deck material, the base 38 is limited in its ability to supply force against the tube portion 16. Consequently, the fastener 10 may not stay retained within the base 38 and the surface layer 36 may then separate from the base 38. Especially in applications where the surface layer 36 has a tendency to push against the flange 18 or otherwise try to separate from the base sheet 12, the securement of the fastener 10 within the base 38 is all the more critical to the ability of the fastener 10 to resist the surface layer 36.

Figure 4:
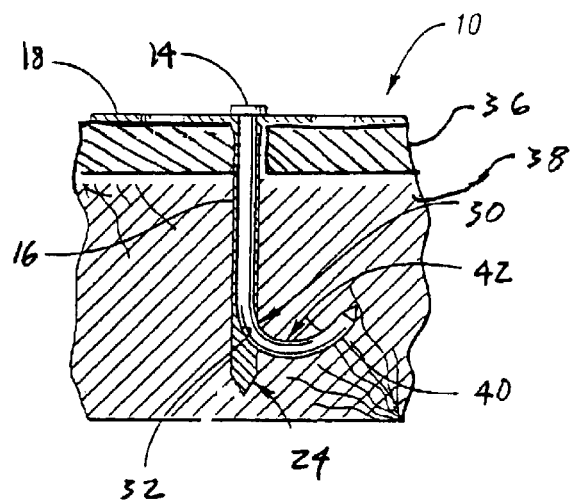
FIG. 4 is a fragmentary section of the base sheet and fastener of FIG. 3 with the nail of the fastener driven into the base sheet in a hook configuration.

As mentioned above and shown with detail in FIG. 4, the fastener 10 provides enhanced securement within the base 38 by driving the nail 14 through the hollow 20, against the camming surface 32, and out the side opening 30. The camming surface 32 interferes with the driven nail 14 and causes a portion 40 of the nail 14 to bend out beyond the side opening 30. The nail 14 bends into a hook configuration. The hook configuration digs into the base 38 to further secure the fastener 10 within the base 38.

The bending action is caused by the camming surface 32 having an arcuate configuration. The arcuate camming surface 32 causes the portion 40 of the nail extending beyond the side opening 30 to curve or bend along a radius 42. The radius 42 is controllable in the casting process by changing the configuration of the camming surface 12. For example, other curves or bends are achieved by configuring the camming surface into angular or slanted configurations instead of the arcuate configuration shown.

A fastener driver 50 for driving the fastener 10 through the surface layer 36 and into the base 38 is shown in FIG. 5. The fastener 10 is retained within a drive housing 52 and driven into the base layer 38 by thrusting or propelling the fastener driver 50 against the surface layer 36.

The fastener driver 50 includes a driving means for driving the nail 14 through the hollow 20 and out the side opening 30. For example, a handle 54 is connected to a driving rod 56 and the driving rod 56 is connected to a spring-loaded weight 58. The spring-loaded weight is connected to driving pin 60 and biased by a spring 62 within a weight cavity 64 of the drive housing 52. An inner cavity 66 provides a passageway between the driving pin 60 and an inlet 68 defined within a non-magnetic end cap 69. A magnet 70 is located proximate the inner cavity 66.

The interference securement of the fastener body 12 to the nail 14 allows the portion 28 of the nail 14 extending beyond the flange 18 to be grasped while the fastener body 12 remains interferencly secured to the nail 14. The magnetic material of the nail 14 is attracted to the magnet 70 and the non-magnetic material of the fastener body 12 is not. Consequently, the fastener 10 can be magnetically retained in the housing 52 by inserting the portion 28 of the nail 14 through the drive housing inlet 68 and into the inner cavity 66 for magnetic attraction by the magnet 70.

With the fastener 10 magnetically positioned relative to the housing 52, an operator can take the handle 54 and thrust the fastener driver 50 and the fastener 10 against the surface 36. Initially, a face 72 of the non-magnetic end cap 69 contacts the flange 18 to cause the closed end 24 of the fastener body 12 to penetrate through the surface 36 and into the base 38, as shown in FIG. 3. Subsequently, the momentum created from downwardly thrusting the fastener driver 50 causes the weight 58 to eventually overcome the biasing created by the spring 62 and drive the driving pin 60 against the nail 14. The driving pin 60 drives the nail 14 out through the side opening 30 and into the hooked configuration, as shown in FIG. 6. Accordingly, the fastener driver 50 is a two-stage driving mechanism. In the first stage, the face 72 drives the closed end 24 of the fastener body 12, and, after a time delay caused by the weight 58 overcoming the biasing of the spring 62, in a second stage, the driving pin 60 drives the nail 14 out through the side opening 30.

The driving device 50 may include a any number of other driving means for driving the fastener 10 into the base sheet 12 instead of the spring-loaded weight described above. Such methods may include: a gearing arrangement; a manual compression arrangement; a torque driving arrangement; a pulley arrangement; or a linkage system.

Figure 7:
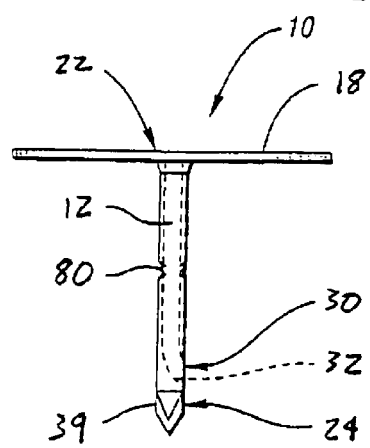
FIG. 7 is a side elevational view of the hollow of the tube portion of the fastener in accordance with an alternative embodiment of the present invention, wherein the tube portion includes at least one dimple therein.

FIG. 7 illustrates another embodiment of the present invention where the hollow 20 of the tube portion 16 includes at least one dimple 80. The dimple 56 obstructs the hollow 20 of the tube portion and provides interference to the nail 14. The dimple 80 may also be used in conjunction with the camming surface 26 to further effect the hooked configuration radius 52.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fastener driver for driving a fastener into a base, the fastener comprising a non-magnetic fastener body interferencly secured to a ferro-magnetic nail, the fastener body includes a body portion having a pointed end portion for penetrating the base and a flange, the secured nail including a portion that extends beyond the flange of the fastener body, the fastener driver comprising:

a drive handle connected to a driving rod;

a drive housing enclosing a portion of the driving rod propellable toward the base by grasping the drive handle;

a face on the drive housing that contacts the flange to drive the fastener body into the base when the drive housing is propelled toward the base;

said drive housing enclosing a driving means for driving the nail;

a magnet within an inlet of the drive housing for temporarily magnetically securing a the portion of the nail extending beyond the flange; and the driving means driving the nail out through a side opening in the pointed end portion of the fastener body in a hook configuration after the fastener body is driven into the base.

2. The fastener driver of claim 1 wherein the driving means includes a weight connected at one side to the driving rod and connected at an opposite side to a driving pin, the weight suspended within a weight cavity of the housing by a spring surrounding the driving pin, the spring providing a biasing force against the weight, wherein the biasing force is overcome by the weight after the fastener body is driven into the base to cause the driving pin to contact the nail for driving the nail out through the side opening in the pointed end portion of the fastener body in the hook configuration.

* * * * *